Nov. 10, 1925.
J. H. SAGER
FENDER
Filed Oct. 7, 1924
1,560,943
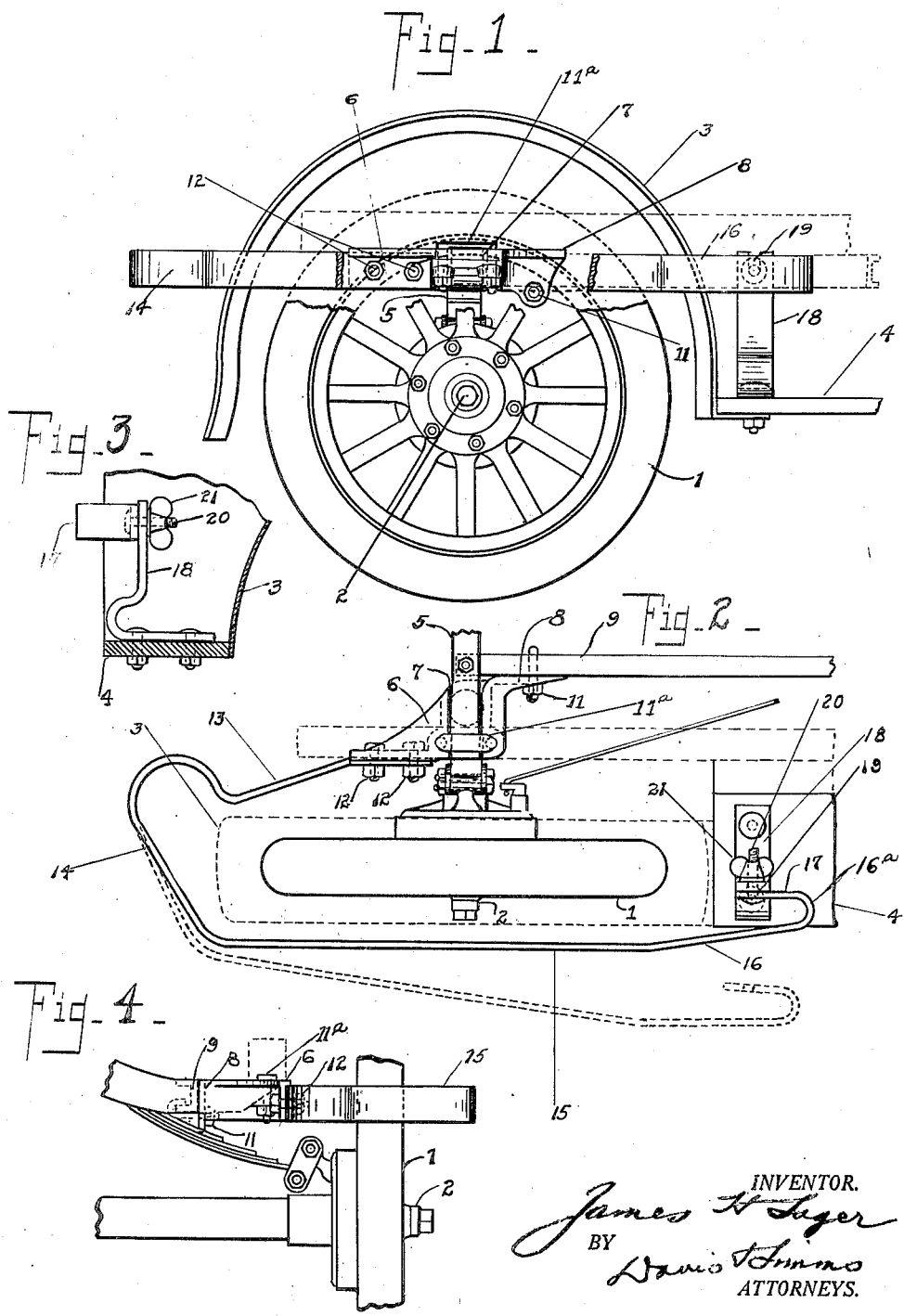
INVENTOR.
James H. Sager
BY
Davis & Simms
ATTORNEYS.

Patented Nov. 10, 1925.

1,560,943

UNITED STATES PATENT OFFICE.

JAMES H. SAGER, OF ROCHESTER, NEW YORK, ASSIGNOR TO J. H. SAGER COMPANY, OF ROCHESTER, NEW YORK, A CORPORATION OF NEW YORK.

FENDER.

Application filed October 7, 1924. Serial No. 742,239.

*To all whom it may concern:*

Be it known that I, JAMES H. SAGER, a citizen of the United States, and resident of Rochester, in the county of Monroe and State of New York, have invented certain new and useful Improvements in a Fender, of which the following is a specification.

The present invention relates to a fender for the protection of a mud guard of a motor vehicle. An object of this invention is to provide a construction which may be used in connection with cars of the type such as a Ford which do not have side bars extending rearwardly beyond the rear wheels. Another object of the invention is to provide in connection with the longitudinally extending impact member at the side of the mud guard, an impact portion preferably in one piece with the longitudinally extending impact portion lying over the outer end of the top surface of one end of the mud guard to act as a fender for such surface. Another object of the invention is to provide a means for securing the longitudinally extending impact member to a portion of the frame substantially over the axle of the wheel and on the inside of the wheel. Still another object of the invention is to provide a novel means in which the longitudinally extending impact member may be moved with reference to the mud guard for the purpose of permitting the removal or refitting of the wheel to the axle.

To these and other ends, the invention consists of certain parts, and combinations of parts, all of which will be hereinafter described: the novel features being pointed out in the appended claims.

In the drawings:

Fig. 1 is a side view with parts in section showing the fender in cooperative relation with the mud guard;

Fig. 2 is a plan view of a part shown in Fig. 1 with a portion of the fender in dotted lines moved away from the mud guard;

Fig. 3 is a sectional view through the running board or step showing the connection of the forward end of the fender with the running board or step; and Fig. 4 is a rear view of the parts shown in Figs. 1 and 2.

Referring more particularly to the drawings, 1 indicates a wheel of an automobile and 2 the axle. The mud guard 3 partially surrounds the wheel and is connected at its forward end to the running board or step 4, the illustrated construction being that of a Ford automobile. Secured to the rear transverse member 5 of the body frame or chassis of the vehicle is a casting or bracket 6 which is formed with a groove or recess 7 in its upper surface for receiving the end of the transverse member 5, this bracket 6 having a forward extension 8 which abuts the outer face of the longitudinally extending member 9 of the frame or chassis through which a J bolt 11 passes to engage the channel member 9. An inverted U-shaped securing device 11ª passes through two vertical openings in the casting 6 on opposite sides of the groove 7 and over the transverse bar 5 to still further secure the bracket to the frame or chassis. The upper surface of the casting or bracket lies snugly against the under side of the body which acts as an additional support for such bracket. The bracket 6 extends rearwardly and has a seat in which one end of the fender is secured by bolts 12.

The fender embodies two portions or parts, one protecting the outer face of one end, in this instance, the rear end of the mud guard against blows and the other protecting the outer side edge. Both portions, in this instance, are formed from a single piece of resilient ribbon steel which extends rearwardly at 13 from the bracket 6. thence outwardly and forwardly at 14 in the vertical plane of the mud guard 3, the portion 14 lying at an oblique angle to the longitudinal axis of the vehicle, so as to act as a deflector for anything that impinges thereagainst. From this portion 14, the fender 15 extends over the outer edges of the mud guard 3 and over the outer face of the wheel 1, preferably above the axis of turning 2 of the latter. The forward portion of the part 15 is deflected inwardly at an angle to the longitudinal axis of the vehicle at 16, so as to provide a deflecting portion and extends over the step 4 being bent inwardly at 16ª and then rearwardly at 17 to connect with an attaching bracket 18 secured to the step 4 and having a slotted arm 19 extending upwardly therefrom in which a bolt 20 is secured, this bolt extending through an opening in the portion 17 of the fender and having thereon a winged nut 21.

It is apparent that when the bolt 21 is loosened, it may be removed from the bracket on the step to permit the fender portion 15 to swing outwardly as shown in dotted lines in Fig. 2, in order that the wheel 1 may be fitted to or removed from the spindle 2.

The portion 14 of the fender protects the mud guard 3 from impact with objects in the plane with the fender and deflects such objects away from such plane. The portion 15 will prevent the bumpers, mud guards or parts of other vehicles engaging the under side of the mud guard 3 near its opposite ends. The portion 16 acts as a deflector for parts engaging therewith and the end 16ª is located over the running board or step 4, so that said end is protected by the running board or step 4 while the end 16ª itself acts as a protection to the bracket to which the forward end is secured.

What I claim as my invention and desire to secure by Letters Patent is:

1. In combination with a vehicle frame having a longitudinally extending bar and a rear transversely extending bar projecting beyond said longitudinally extending bar, a wheel supporting said frame, a mud guard above the wheel, a step connected at one end of the mud guard, a bracket formed with a socket in its upper face receiving the projecting end of the transversely extending bar, a U-shaped bolt passing above said projecting end of the transversely extending bar and through said bracket, and a mud guard fender extending rearwardly from the bracket, outwardly through the vertical plane of the mud guard, and forwardly across the outer face of the edge of the mud guard, and secured to said step.

2. The combination with a frame of a vehicle, a wheel supporting said frame, a mud guard for the frame, and a running board secured to the mud guard, of a one piece fender for the mud guard extending rearwardly from the frame, outwardly through the vertical plane of the mud guard and forwardly over the outer face of the edges of the mud guard, its forward end being secured to the step.

3. The combination with a vehicle frame, a wheel supporting the frame, and a mud guard for the frame, of a one piece fender for the mud guard formed from a strip of resilient material having a portion extending through the vertical plane of the mud guard to protect the outer face of the latter, and across the outer face of the side edge of the mud guard to protect the underside of the ends of the latter.

4. The combination with a frame of a motor vehicle, a wheel supporting said frame, and a mud guard for the wheel, of a one piece fender for the mud guard formed of resilient material and extending rearwardly from the frame, outwardly and forwardly through the vertical plane of the mud guard and forwardly across the outer edge of the mud guard, and means for detachably securing its free end.

5. The combination with a frame of a vehicle, a wheel supporting said frame, a mud guard for the wheel, and a running board secured to the forward end of the mud guard, of a one piece fender for the mud guard formed from resilient material, and extending rearwardly from the frame, outwardly through the vertical plane of the mud guard and forwardly across the outer face of an edge of the mud guard, and means detachably securing the forward end of said fender to the running board.

6. A one piece fender for the protection of a mud guard of a motor vehicle having a portion for extending through the vertical plane of the mud guard, and a portion for extending across the outer face of an edge of the mud guard, said fender being formed of resilient material, means for securing opposite ends of said fender, the means securing that end nearest the portion extending across the outer face of the edge of the mud guard having provision for permitting said end to be released to permit the flection of the fender for the removal or fitting of a wheel under the mud guard.

JAMES H. SAGER.